United States Patent [19]
Klann

[11] Patent Number: 6,070,762
[45] Date of Patent: Jun. 6, 2000

[54] DEVICE FOR EMPTYING CLOSED CONTAINERS, ESPECIALLY FUEL FILTERS

[75] Inventor: Horst Klann, Villingen-Schwenningen, Germany

[73] Assignee: Angelika Weibhaar, Germany

[21] Appl. No.: 08/814,543

[22] Filed: Mar. 10, 1997

[51] Int. Cl.[7] .................................................. B67D 5/00
[52] U.S. Cl. .......................... 222/83.5; 222/87; 222/478; 141/98; 141/329
[58] Field of Search .............................. 222/81, 83.5, 87, 222/325, 478; 141/98, 329, 330

[56] References Cited

U.S. PATENT DOCUMENTS

| | | | |
|---|---|---|---|
| 4,951,512 | 8/1990 | Mazza et al. | 141/329 |
| 5,309,956 | 5/1994 | Hajma | 222/87 |
| 5,529,097 | 6/1996 | Campbell | 222/87 |
| 5,546,979 | 8/1996 | Clark, II et al. | 141/330 |
| 5,558,140 | 9/1996 | Clark, II | 141/329 |

FOREIGN PATENT DOCUMENTS 43 29 258 C1   4/1995   Germany.

*Primary Examiner*—Kevin Shaver
*Assistant Examiner*—Keats Quinalty
*Attorney, Agent, or Firm*—McGlew and Tuttle, P.C.

[57] ABSTRACT

A device (1) for emptying closed containers which are under pressure, especially fuel filters, which can be detachably fastened to the container, firmly seated thereon, and which has a drain channel with a drain opening, in which a drill (12) which can be actuated via a spindle drive (9) is arranged for drilling through the container wall (54). To break a vacuum generated during the emptying, a vent hole is created by a piercing spike (7) in the container wall (54) on the side opposite the drill (12). The piercing spike (7) is part of the entire device (1) and is used together with the drill (12) as a holding element for clampingly receiving the container during the drilling of the container by the drill (12).

10 Claims, 3 Drawing Sheets

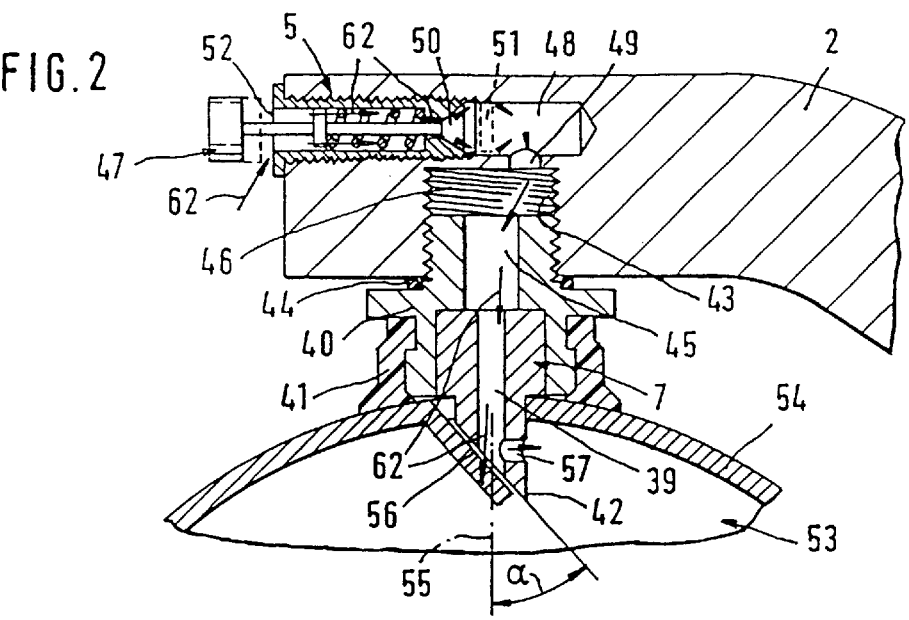
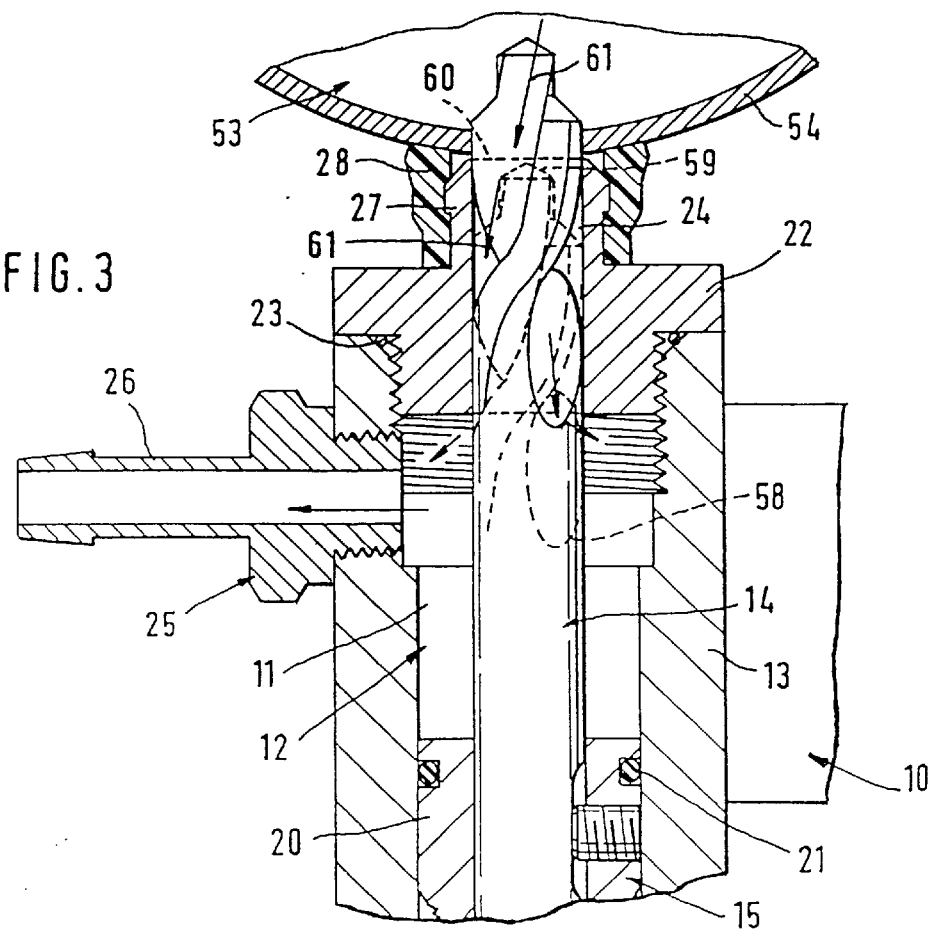

Fig. 4
Fig. 5
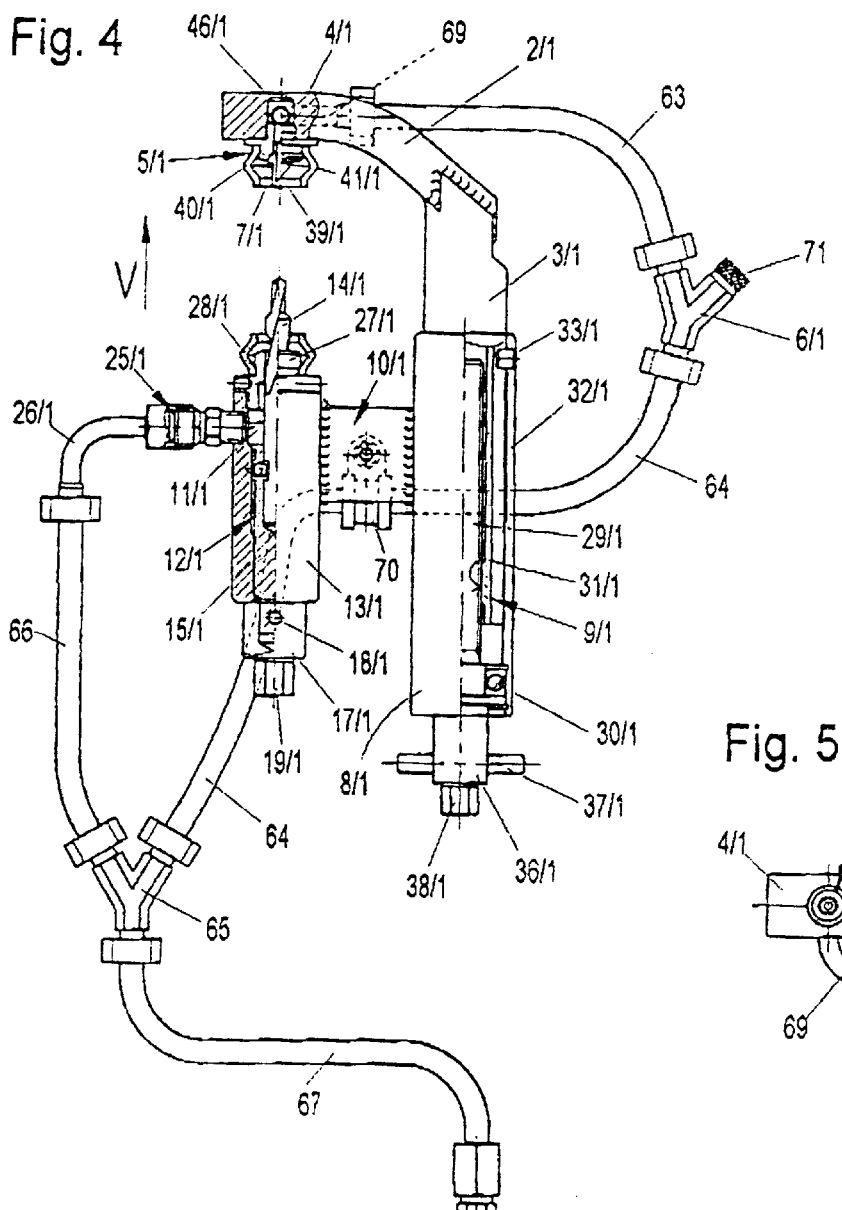
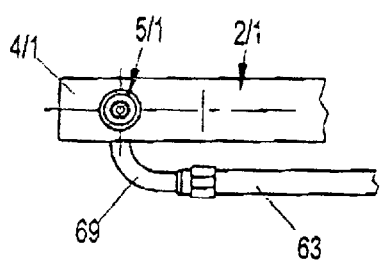

DEVICE FOR EMPTYING CLOSED CONTAINERS, ESPECIALLY FUEL FILTERS

FIELD OF THE INVENTION

The present invention pertains to a device for emptying closed containers which are under pressure, especially fuel filters, which device can be detachably fastened to the container, firmly seated thereon, and which has a drain channel with a drain opening, in which channel a drilling means for drilling through the container wall is arranged, which drilling means can be actuated by means of a spindle drive, wherein the drain channel can be brought sealingly into contact with the container wall at least during the emptying.

BACKGROUND OF THE INVENTION

In modern motor vehicles, gasoline filters are usually changed cyclically every 30,000 to 60,000 km or also in the case of disturbances in the fuel supply system. This means that a very frequent fuel filter change takes place in light of the large number of registered motor vehicles. If the motor vehicle is turned off, the fuel in the fuel filter is still exposed to overpressure. This means that fuel escapes into the atmosphere when the fuel line is simply removed from the fuel filter. As a result, enormous amounts of fuel enters the atmosphere as a consequence of the frequent fuel filter change and the sometimes large capacity. To avoid this environmental pollution, a device has been known, with which fuel can be drained from the otherwise closed housing of the fuel filter, without fuel escaping into the atmosphere (German Patent No. DE-PS 43 29 258 C1).

This prior-art device for emptying a container, especially a fuel filter of motor vehicles, has a holding means, which comprises essentially a circular disk-shaped base plate. The base plate can be fastened to the fuel filter by means of a holding strap bent in the shape of a half ring. To tighten the holding strap, which surrounds the fuel filter at least partially in the mounted state, a yoke-shaped tightening lever is provided, which can be hung onto the holding strap via a longitudinally adjustable tightening member, so that the tightening length of the holding strap can be adjusted to different diameters of fuel filters.

A drain pipe provided with external threads is fastened on the side of the base plate located opposite the holding strap. A drain channel, whose opening is surrounded on the container side by a ring seal, via which the drain channel is in sealing contact with the container wall, extends through the drain pipe and through the base plate.

A drain container, which has a drilling tool in the form of a twist drill, can be screwed onto the drain pipe via a corresponding screw thread. The twist drill passes through the drain container to its container bottom located opposite the screw thread and is fastened in a firmly seated manner there. The twist drill extends beyond the drain container in the axial direction toward the container, so that when the drain container is screwed onto the drain channel, the twist drill drills through the wall of the fuel filter, and a drain opening is formed in the wall of the fuel filter. The liquid flowing out of the fuel filter through the drain opening directly enters the drain container via the drain channel, without entering into the atmosphere.

After part of the liquid has run off from the fuel filter, the liquid pressure in the fuel filter is reduced, so that the fuel flows into the drain container only very slowly, and the prior-art drain means and the fuel filter form a system which is hermetically sealed to the outside due to the sealing element provided between the base plate and the fuel filter. The consequence of this is that a vacuum is generated in the fuel filter during the continued flow of liquid from the fuel filter, so that no more liquid enters the drain container after a certain amount has flown out. To make it possible to completely empty the fuel filter, a vent opening must be provided in its wall. A type of wrench is provided to create this vent opening. It is a wrench in the manner of a usual pipe wrench, whose gripping jaws are designed to grip around the fuel filter. One of the gripping jaws is provided with a radially inwardly pointing piercing spike, which can be brought into contact with the fuel filter at its top. When the wrench is squeezed, the piercing spike is pressed into the outer wall of the fuel filter, so that the desired vent opening is formed. The drawback of this manner of creating a vent opening in the wall of the fuel filter is that with the fuel filter installed, it is very difficult or even impossible to use the wrench because of the frequently very crowded space conditions in the area of the fuel filter. Furthermore, the wrench itself is very difficult to handle, because strong actuating forces are necessary to pierce the wall to create the vent opening, especially in the case of fuel filters having steel housings.

SUMMARY AND OBJECTS OF THE INVENTION

In contrast, the primary object of the present invention is to provide a device of this type, with which it is possible to empty containers being under pressure, without the liquid being able to escape into the atmosphere, and with which it is also possible at the same time to create a vent hole in the container wall when vacuum is built up to break this vacuum.

The object is accomplished according to the present invention in that the drain channel with its drilling means is arranged at the end of a first fork arm, which is fastened to a guide pipe, in which a telescopic pipe is guided axially displaceably; that a second fork arm, which is located in the same plane as the first fork arm, the telescopic pipe and the guide pipe and at the end of which a ventilating means with a piercing spike is provided, is provided at the end of the telescopic pipe; and that the piercing spike pierces the wall of the container, which is clampingly held between the piercing spike and the drilling means or the drain channel, by reducing the distance between the first fork arm and the second fork arm.

The device according to the present invention represents a device with which a fuel filter, especially a fuel filter of motor vehicles, can be completely emptied in a simple manner. To achieve this, the device according to the present invention has a drain channel with a drilling means, which is arranged at the end of a fork arm. This fork arm is fastened to a guide pipe, in which a telescopic pipe is guided axially displaceably. A second fork arm, which extends in the same plane as the first fork arm of the drilling means and the drain channel, is arranged at the outer end of the telescopic pipe. The free end of this second fork arm has a vent means with a piercing spike, which can be moved toward the drilling means by axially displacing the telescopic pipe in the guide tube, wherein the piercing spike is arranged extending coaxially to the drain channel. The distance between the drilling means and the piercing spike can also be adjusted due to this axial displacement of the telescopic pipe in the guide tube, so that fuel filters with different diameters can be clampingly picked up in the device according to the present invention between the drilling means or the drain channel and the piercing spike.

To empty a fuel filter, the distance between the piercing spike and the drilling means or the drain channel is first adjusted to the diameter of the fuel filter, so that the device according to the present invention with its piercing spike can be placed on the cylindrical jacket surface of the wall of the fuel filter on the top side. The drain channel with its drilling means is now arranged at the wall of the fuel filter, diametrically opposite the piercing spike and is moved toward the wall by an axial displacement of the telescopic pipe in the guide tube, until the fuel filter is clampingly held between the piercing spike and the drilling means or the drain channel. The telescopic pipe and the guide tube are arranged in this state laterally next to the fuel filter.

The drain channel is now in sealing contact with the wall of the fuel filter by means of an attached seal. By actuating the drilling means, a drain opening is now created in the wall of the fuel filter, so that the fuel present in the fuel filter can flow into the drain channel from the fuel filter. After a certain amount of fuel has flown out of the fuel filter, a vacuum is generated in the fuel filter, so that no more fuel enters the drain channel. The piercing spike is now pressed through the wall of the fuel filter by further reducing the distance between the piercing spike and the drain channel or the drilling means by axially displacing the telescopic pipe in the guide tube, so that a vent opening is formed in the said wall. Ambient air can now flow into the fuel filter through this vent opening, so that the vacuum is broken in the fuel filter, and the residual fuel can flow off into the drain channel.

The drilling means is preferably formed by a twist drill, which is arranged extending coaxially in the drain channel and can be moved rotatingly axially toward the wall and through the wall while drilling by means of a drill spindle which can be rotated in and out in the drain channel to drill through the wall of the container seated at the drain channel. With this structure the twist drill first drills through the wall of the fuel filter during the actuation of the drilling means, without the piercing spike piercing the wall of the fuel filter.

A distance between the first fork arm with its drilling means and the second fork arm with its ventilating means can preferably be adjusted to different diameters of a container to be emptied by axially adjusting the telescopic pipe by means of a spindle drive in the guide tube. Due to this structure, the device according to the present invention can be used for fuel filters and for other containers to be emptied as well. The force needed to feed the twist drill in the axial direction is extremely small due to the short feed of the twist drill per revolution by the drill spindle, so that it is ensured that the piercing spike is not pressed accidentally through the wall of the container during the drilling process and consequently while the container or the fuel filter is still under overpressure.

A tubular design of the piercing spike is preferably provided having a tubular design and having a coaxially extending vent hole, which is connected to a tapping valve, by the actuation of which ambient air can be fed to the said piercing spike pierced through the wall of the container to be emptied or to its vent hole to ventilate the said container. This ensures that the ambient air enters the fuel filter through the piercing spike, without the piercing spike having to be removed at least partially from the vent opening created by the piercing spike to ventilate the fuel filter.

Reliable ventilation of the fuel filter is guaranteed through a radial hole of the piercing spike stabbed into the wall of the fuel filter, which hole is located within the fuel filter, even when the wall section pressed inward by the piercing spike partly in a tongue-like manner closes the central vent hole of the piercing spike, which extends coaxially in same, at its end while the piercing spike is being stabbed through the wall of the fuel filter.

It is guaranteed due to the embodiments according to the invention that no fuel can enter the atmosphere during the emptying of the fuel filter. Fuel is reliably prevented, by the tapping valve provided, from entering the atmosphere accidentally via the piercing spike and the vent openings connected to same. It is ensured especially by the flexible tube seal that no fuel can enter the environment even if the piercing spike has been pressed through the wall of the fuel filter to prepare the vent hole before the overpressure in the fuel filter is released. The length of the flexible tube seal is preferably selected to be such that a sufficient sealing action is already present when the tip of the piercing spike is in contact with the container wall or at least at the moment at which the piercing spike breaks through the wall of the fuel filter. This also makes it possible, in particular, to push the piercing spike through the wall of the fuel filter to prepare the vent hole before the pressure in the fuel filter is released, and to prepare the drain hole by means of the drilling means only thereafter. It is obvious that the tube seal is correspondingly elastically deformable and is correspondingly compressible in the axial direction during the preparation of the vent hole.

A drain channel is preferably provided with a drain socket for a flexible tube, via which the drain channel can be connected to a liquid-collecting container such that even larger amounts of liquid or fuel can be drained off from a larger fuel filter, which can be safely drained into the liquid container provided via the flexible tube, without entering the atmosphere.

It is ensured by a guide collar of the drill spindle with its O-ring seal according to further features of the invention that no liquid can escape from the drain channel, from which the drill spindle projects for actuation.

Variable possibilities of operating the device according to the present invention are achieved due to the connection of the ventilating means to the hose pipe of the drain channel of the drilling means or directly to the liquid collection container. The vent hole may be prepared due to this design optionally before or after the preparation of the drain hole by means of the drilling means. Especially if the vent hole is prepared before the drain hole, the overpressure present in the fuel tank can be released directly via the vent hole and its flexible pipeline either via the hose tube or directly into the liquid collection container. This simplifies the operation of the device according to the present invention. After this overpressure has been released, the fuel can run off from the fuel filter through the drain hole prepared until a vacuum builds up. To release the vacuum generated in the fuel filter, the vent valve provided in the flexible pipeline of the ventilating means is opened, so that ambient air can flow into the fuel filter via this tube and the ventilating means with its piercing spike, and the residual fuel flows off into the liquid collection container without pressure. The ventilating valve may be formed by a tapping valve or a screw valve, and it is easily accessible due to a corresponding arrangement in the flexible pipeline.

The present invention will be explained in greater detail below on the basis of the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is an enlarged detail II from FIG. 1;

FIG. 3 is an enlarged detail III from FIG. 1;

FIG. 4 is a partially sectional view of a second exemplary embodiment of the device according to the present invention; and FIG. 5 is a partial cutaway view V from FIG. 4.

DESCRIPTION OF THE PREFERRED EMBODIMENTS

Figure 1:
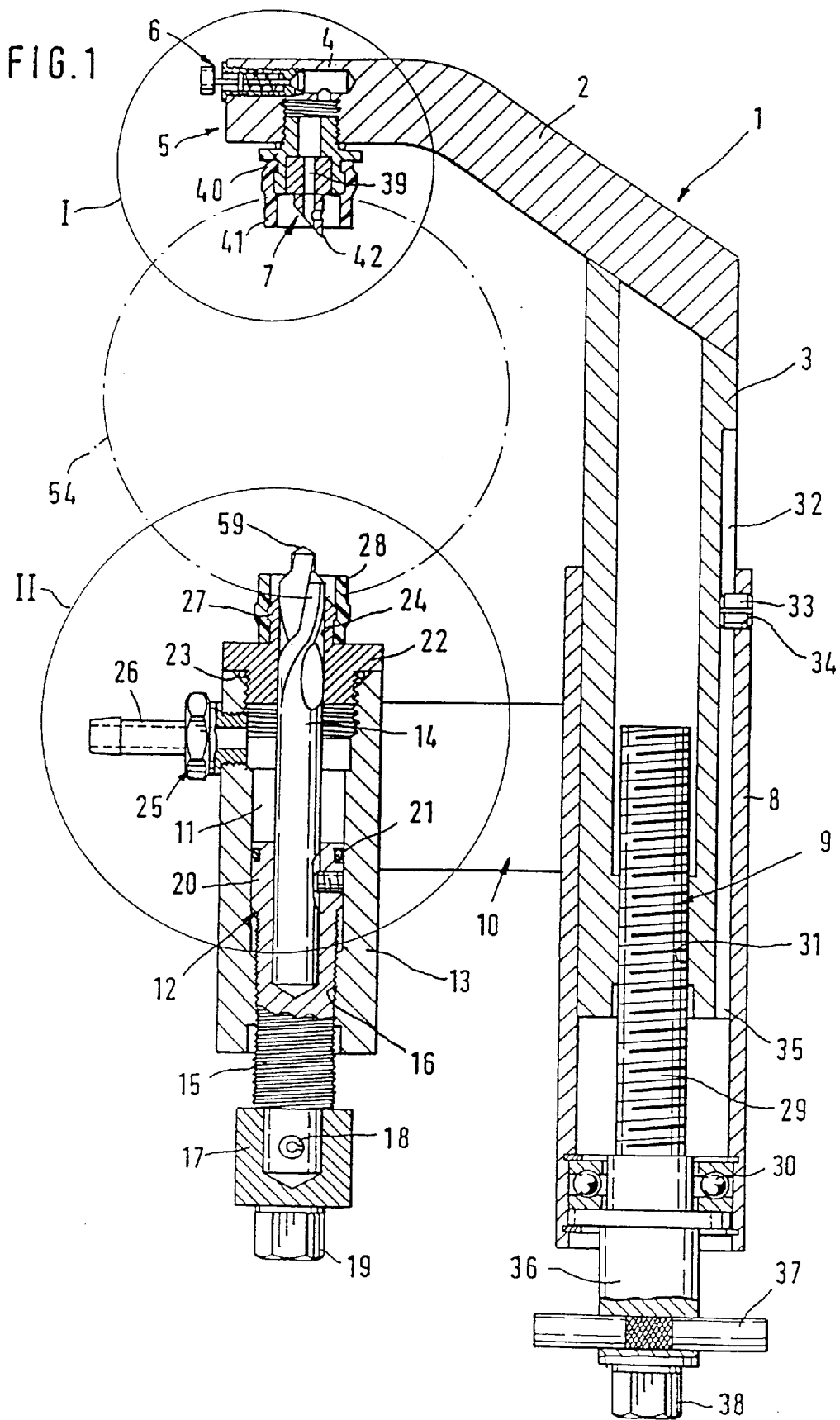
FIG. 1 is a sectional view of a device of the type according to the present invention.

Referring to the drawings in particular, a device 1 according to the present invention has an upper fork arm 2, which is fastened to the top end of a telescopic pipe 3. At its free end 4 located opposite the telescopic pipe 3, the fork arm 2 has a ventilating means 5, which is provided with a vent valve 6 and a piercing spike 7.

The telescopic pipe 3 is guided axially displaceably in a guide tube 8 and is arranged adjustably in its axial position in the guide tube 8 by means of a spindle drive 9. The guide tube 8 has a lower fork arm 10, which lies in the same vertical plane as the upper fork arm 2, and at the free end of which a drain channel 11 with an integrated drilling means 12 is arranged. The drain channel is formed by a drain pipe 13, which extends in parallel to the guide tube 8 and in which the drilling means 12 is arranged. The drilling means 12 comprises a twist drill 14, which is mounted rotatably in unison in a drill spindle 15. The drill spindle 15 is screwed axially adjustably into the drain pipe 13 via a corresponding screw-in thread, so that when the drill spindle 15 is being actuated, the twist drill 14 is axially adjustable in the drain pipe 13 and consequently in the drain channel 11. At its lower end, the drill spindle 15 has a wrench head 17, which is mounted firmly seated on the drill spindle 15 by means of a slotted pin 18. To actuate the drill spindle 15, the wrench head 17 has a corresponding wrench profile in the form of a hexagon 19 at its lower, free end. At its top end, seated in the drain pipe 13 or in the drain channel 11, the drill spindle 15 is provided with a radially expanded guide collar 20, by means of which the drill spindle 15 is guided in the drain pipe 13 in a nearly clearance-free manner. An O-ring seal 21, by means of which the drain channel 11 is sealed in the downward direction against the guide collar 20 of the drill spindle 15, is provided in the guide collar 20. The twist drill 14 projects over the drill spindle 15 axially in the upward direction.

A guide sleeve 22, which is sealed against the drain pipe 13 by means of an O-ring seal 23 in the assembled state, is screwed in at the top end of the drain pipe 13. The guide sleeve 22 has a central guide hole 24, which extends coaxially to the drain pipe 13, into which the twist drill 14 of the drill spindle 15 extends, and in which the twist drill 14 is guided. An approximately radially extending drain socket 25 is screwed in tightly under the guide sleeve 22. The drain socket 25 has a connection pipe branch 26, to which a drain tube (not shown in the drawing) can be attached to drain the liquid into a corresponding collection container.

The guide sleeve 22 is provided with a pipe branch 27, which extends beyond it in the upward direction coaxially to its guide hole 24, and to which a pipe seal 28 extending beyond the said pipe branch 27 axially in the upward direction is attached.

The axial distance between the piercing spike 7 and the drilling means 12, which are located coaxially opposite each other, can be set by means of the spindle drive 9. The spindle drive 9 has for this purpose a threaded spindle 29, which is mounted axially nondisplaceably but rotatably in the guide tube 8 via a thrust bearing 30. For the axial adjustment, the threaded spindle 29 engages a corresponding female thread 31 of the telescopic pipe 3, so that the telescopic pipe 3 is displaced axially in the guide tube 8 when the threaded spindle 29 is actuated. To prevent the telescopic pipe 3 from rotating in the guide tube 8 during the actuation of the threaded spindle 29, the telescopic pipe 3 is provided with a guide groove 32, into which extends, e.g., a slotted pin 33, which is arranged in a corresponding radial through hole 34 at the top end of the guide tube 8 and extends radially into the guide groove 32. The telescopic pipe 3 is thus mounted axially displaceably in the guide tube 8 and nonrotatably due to the guide groove 32 and the slotted pin 33. The guide groove 32 extends approximately over the entire length of the telescopic pipe 3 and is open at its lower end 35.

To actuate the threaded spindle 29, the latter has an actuating lever 37 at its end 36 projecting from the guide tube 8, and the said actuating lever passes transversely through the spindle head 36 of the threaded spindle 29 and is used to manually actuate the threaded spindle 29. To make it possible to apply stronger actuating forces on the threaded spindle 29, the latter is provided at the lower end of its spindle head 36 with a hexagon 38, to which a corresponding wrench tool can be attached to actuate the threaded spindle 29.

As is apparent from FIG. 2, the piercing spike 7 is provided with a central vent hole 39 and is arranged firmly seated in a pipe branch 40. A flexible tube seal 41, which extends axially beyond the pipe branch 40 in the downward direction, is provided on the pipe branch 40. The length of the flexible tube seal 41 is selected to be such that, as is apparent from FIG. 2, the piercing spike 7 extends minimally in the axial direction beyond the flexible tube seal with its spike tip 42. However, it is also conceivable that the flexible tube seal 41 is made longer, so that it always exerts a sealing action between the pipe branch and the wall 54 of the container 53. The pipe branch 40 is screwed into a corresponding receiving thread 43 of the upper fork arm 2 and is sealingly connected to the fork arm 2 by means of an O-ring seal 44. The pipe branch 40 has a through hole 45, which opens into a ventilation space 46 of the fork arm 2, in the coaxial extension toward the vent hole 39 of the piercing spike 7. The ventilating means 5 is arranged above the ventilation space 46. The ventilating means comprises a spring-loaded tapping valve 47, which is screwed into a threaded hole 48 extending at right angles to the pipe branch 40. The threaded hole 48 is in connection with the ventilation space 46 and thus also with the through hole 45 and the vent channel 39 of the piercing spike 7 via a connection channel 49. By actuating the tapping valve 47 or by displacing the valve disk 50 of the tapping valve 47 into the position 51 shown in broken line in FIG. 2, the tapping valve 47 is opened, so that ambient air can flow from the outside 52 of the tapping valve 47 through the tapping valve 47 via the threaded hole 48, the connection channel 49, the through hole 45, and through the vent hole 39, as is indicated as an example by the arrows 62 in FIG. 2.

The piercing spike 7 is used to pierce a container 53 to be ventilated, whose wall 54 is shown as an example in FIG. 2.

To obtain weak pressing forces, the piercing spike 7 is ground to have a sharp edge at an angle α of about 15° to 30° obliquely to its longitudinal central axis 55. A lid-like tongue 56 is formed in the area of the piercing spike 7 due to the free cut by means of the piercing spike 7 when the wall 54 is being pierced. Since this tongue may be located in front of the opening of the vent hole 39, especially in the case of aluminum containers, and this opening may thus be closed by the tongue 56, another, radially extending, additional radial hole 57 is provided in the piercing spike 7, and this additional radial hole 57 is arranged such that it will be located within the container 53 with certainty after the wall 54 has been pierced, so that the container can be reliably ventilated via the piercing spike 7.

FIG. 3 shows an enlarged representation of the drilling means 12. By rotating the drill spindle 15, the twist drill 14 can be brought into its upper end position shown in FIG. 3 from its position 58 indicated by broken line in FIG. 3, in which it is located with its drill bit 59 under the top end edge 60 of the pipe branch 27. By rotating and axially displacing the drill 14, it drills through the wall 54 of the container 53, while the container 53 is sealingly connected to the drain channel 11 through the flexible tube seal 28. In this position of the drill 14, with which the wall 54 was drilled through, liquid located in the container 53 can enter the drain channel 11, as is shown in FIG. 3, along the drill 14, as is indicated as an example by the arrows 61, and the liquid can flow from the said drain channel 11 to a collection container via the drain socket 25 and its connection branch 26 via a corresponding connection tube.

To empty the closed container 53 or fuel filter 53, a vacuum builds up after a certain amount of liquid or fuel has been drained off, so that no more liquid can flow out of the container 53 through the guide hole 24 or through the drain channel 11. To enable more liquid to flow out of the container 53, the tapping valve 47 is actuated, as was described above in connection with FIG. 2, to ventilate the container 53, so that air can flow into the container 53 from the outside. The vacuum is broken in the container 53 due to this inflow of air, so that the residual liquid present in the container 53 can continue to flow into a corresponding collection container via the pipe branch 27, the drain channel 11, and the drain socket 25.

To attach the device 1 according to the present invention to a container, especially a fuel filter, the distance between the top end of the pipe branch 27 and the spike tip 42 of the piercing spike 7 is adjusted by means of the spindle drive 9 to match the diameter of the fuel container, so that the fuel container is clampingly held between the piercing spike 7 and the pipe branch 27. A sealing connection is established between the fuel filter and the drain channel 11, on the one hand, and the piercing spike 7, on the other hand, by the two pipe seals 28 and 41 of the drilling means 12 and the piercing spike 7, respectively. In this position, in which the drill is fixed on the fuel filter, the drill spindle 15 is now actuated, so that the drill 14 drills through the container wall by rotating and being axially displaced in the direction of the container wall. The pitch of the thread of the drill spindle 15 is selected to be such that the twist drill 14 drills through the wall 54 of the fuel filter 53 with a short feed during the drilling process, while an extremely weak feeding force is applied, and it is guaranteed during this drilling process that the piercing spike 7 does not accidentally penetrate through the wall of the fuel filter. As is shown in FIGS. 1 and 3, the drill 14 may have a stepped design, so that it at first has a smaller cutter diameter at its container-side end, as a result of which simpler drilling through the wall of the fuel container can be achieved.

After the wall of the fuel filter has been drilled through, fuel flows from the fuel filter into the drain channel 11 through the guide hole 24 along the drill 14, and it can be drained from the drain channel 11 into a corresponding collection container via the connection pipe branch 26 of the drain socket 25. After a certain vacuum has built up in the fuel filter after the draining of a certain amount of the liquid from the fuel filter, as was explained above, the spindle drive 9 is actuated via its actuating lever 37 or its hexagon 38 to reduce the distance between the pipe branch 27 and the piercing spike 7 to pierce the wall of the fuel filter with the piercing spike 7.

Due to the sharp-edged design of the piercing spike 7 and its oblique grinding, the piercing spike penetrates the wall of the fuel filter during the continued actuation of the spindle drive 9, and a sealing connection is ensured by the flexible tube seal 41 between the piercing spike 7 and the container wall of the fuel filter. By actuating the ventilating means 5 or the tapping valve 47 in the ventilating means 5, air is fed into the interior space of the fuel filter from the outside, so that the vacuum is broken in the fuel filter, and the residual liquid present in the fuel filter can flow off with certainty.

FIGS. 4 and 5 show a second exemplary embodiment 1/1 of a device according to the present invention for emptying closed containers, especially fuel filters. The device 1/1 has a design that is essentially identical to that of the device from FIGS. 1 through 3, and it also has an upper fork arm 2/1, at the free end 4/1 of which a ventilating means 5/1 is provided. The upper fork arm 2/1 is arranged firmly seated at the upper end of a telescopic pipe 3/1. The ventilating means 5/1 also has a piercing spike 7/1, which is arranged in a pipe branch 40/1. A flexible tube seal 41/1, whose length approximately corresponds to the length of the piercing spike 7/1, is provided on the said pipe branch 40/1. The piercing spike 7/1 has a design identical to that of the piercing spike 7, as it is shown as an example in FIG. 2, and the radial hole (57) from FIG. 2 is not shown in FIGS. 4 and 5 for the sake of clarity.

The telescopic pipe 3/1 is guided axially displaceably in a guide pipe 8/1, and a slotted pin 33/1, which is arranged firmly seated in the guide pipe 8/1 and extends radially inwardly into a guide groove 32/1 of the telescopic pipe 3/1, is provided for the nonrotatable mounting of the telescopic pipe 3/1 in the guide pipe 8/1. In the area of its lower end, the telescopic pipe 3/1 has a female thread 31/1, which forms a spindle drive 9/1 together with a threaded spindle 29/1. The threaded spindle 29/1 is mounted axially nondisplaceably and rotatably in the guide pipe 8/1 via a thrust bearing 30/1. The threaded spindle 29/1 also has, at its lower end, a spindle head 36/1, which projects axially beyond the guide pipe 8/1 in the downward direction, as well as an actuating lever 37/1 and a drive hexagon 38/1.

A lower fork arm 10/1, at the free end of which a drilling means 12/1 is arranged, is provided approximately in the top third of the guide pipe 8/1. This drilling means 12/1 corresponds to the drilling means from FIGS. 1 and 3 and its function is identical to that of the drilling means 12. Thus, the drilling means 12/1 has a drain pipe 13/1, a twist drill 14/1, as well as a drill spindle 15/1. The drill spindle 15/1 is provided at its lower end with a wrench head 17/1, which is nonrotatably mounted on the drill spindle 15/1 by means of a slotted pin 18/1. At its lower end, the wrench head 17/1 has a hexagon 19/1, via which the drill spindle 15/1 is actuated to rotate by means of a corresponding wrench tool. A pipe branch 27/1 with a flexible tube seal 28/1 is provided at the top end of the drain pipe 13/1. The drain pipe 13/1 forms a drain channel 11/1, which corresponds to the drain channel 11 from FIG. 3. This drain channel 11/1 is connected to a connection pipe branch 26/1 via a drain socket 26/1.

The connection pipe branch 26/1 is connected to a liquid-collecting container 68 via a drain pipe 66, a connection T-piece 65, and a discharge pipe 67. Thus, fuel is able to flow from the fuel filter housing into the liquid-collecting container 68 via the drain socket 25/1, the connection pipe branch 26/1, the drain pipe 66, the connection T-piece 65, and the discharge pipe 67 in the manner described in connection with the first exemplary embodiment according to FIGS. 1 through 3 after a liquid container, especially a fuel filter housing, has been drilled by means of the twist drill 14/1.

This second exemplary embodiment of the device 1/1 according to the present invention differs from the first exemplary embodiment according to FIGS. 1 through 3 essentially by the design of the ventilating means 5/1. A corresponding ventilating channel 39/1 passes through the piercing spike 7/1 through the pipe branch 40/1 and into a ventilation space 46/1. This ventilation space 46/1 is connected with a connection pipe branch 69 connected on the outside to the end 4/1 of the upper fork arm 2/1 to a pipeline 63. This pipeline 63 leads from the connection pipe branch 69 to a vent valve 6/1, which in turn is in connection with the connection T-piece 65 via another pipeline 64.

Due to the corresponding design of the flexible tube seal 41/1 of the pipe branch 40/1, as well as due to the length of the piercing spike 7/1 being correspondingly coordinated with this, the piercing spike 7/1 can penetrate into the fuel filter container to prepare a vent hole already before the fuel filter housing is drilled by means of the twist drill 14/1. An opening or the vent hole is prepared in the fuel filter housing by the penetration of the piercing spike 7/1, so that the pressurized air reaches via the vent holes 30/1 of the piercing spike 7/1, the ventilation space 46/1, the connection pipe branch 69, as well as the pipeline 63, the vent valve 6/1 and the pipeline 64 to the connection T-piece 65. As a result, the overpressure in the fuel filter housing is released at the same time, and fuel is drained off even during this pressure release through the connection pipe branch 69, the pipeline 63, the vent valve 6/1, as well as the pipeline 64 to the connection T-piece 65. This fuel flows from the connection T-piece 65 into the liquid-collecting container 68 via the discharge pipe 67.

After the pressure in the fuel filter housing has been reduced, the fuel filter housing can subsequently be drilled by means of the drilling means 12/1, so that fuel can enter the liquid-collecting container 68 through the drain hole prepared in the fuel filter housing as a result via the drain socket 25, the connection pipe branch 26, the drain pipe 66, the connection T-piece 65, and the discharge pipe 67.

A vacuum is generated in the fuel filter housing due to this draining of the fuel from the said housing, so that it is necessary after some time to ventilate the fuel filter housing. The vent valve 6/1, which has a vent screw 71, which is now opened to ventilate the fuel filter housing, is provided for this purpose. Thus, ventilating air enters the fuel filter container via the said vent screw 71 of the vent valve 6/1, the pipeline 63 and the connection pipe branch 69 via the ventilation space 46/1 and the vent hole 39/1 of the piercing spike 7/1, so that the vacuum built up therein is released, and the fuel can be completely emptied.

The device according to the present invention for emptying containers, especially fuel filters, represents a device by means of which it is reliably possible to completely empty a fuel filter, wherein the vent hole necessary for this in the wall of the fuel filter can be created in the wall of the fuel filter without an additional ventilating device in the form of piercing tongs or the like after or before the fuel filter has been drilled open.

While specific embodiments of the invention have been shown and described in detail to illustrate the application of the principles of the invention, it will be understood that the invention may be embodied otherwise without departing from such principles.

I claim:

1. A device for emptying closed containers which are under pressure, especially fuel filters, which can be detachably attached to the container and firmly seated thereon, the device comprising:

a first fork arm;

a guide tube;

a telescopic pipe guided axially displaceably within said guide tube;

a second fork arm located in the same plane as said first fork arm, said telescopic pipe and said guide tube, said first fork arm being connected to said guide tube and said second fork arm being connected to an end of said telescopic pipe;

drain channel means defining a drain channel with a drain opening, said drain channel means being connected to an end of said first fork arm;

drilling means, which can be actuated by means of a spindle drive, arranged in said drain channel means for drilling through a wall of the container, wherein said drain channel can be brought sealingly into contact with the wall of the container during emptying;

ventilating means for ventilating said container, said ventilating means including a piercing spike, said ventilating means being provided at an end of said second fork arm, whereby said piercing spike pierces the wall of the container held clampingly between said piercing spike and said drilling means or said drain channel means by reducing a distance between said first fork arm and said second fork arm.

2. The device in accordance with claim 1, said drilling means comprises twist drill element arranged extending coaxially in said drain channel means and movable rotatingly axially toward the wall of the container and through the wall of the container and a drill spindle, said drill element being rotatable in and out of said drain channel means to drill through the wall of the container seated at said drain channel means.

3. The device in accordance with claim 1, further comprising a spindle drive in said guide tube for adjusting said distance between said first fork arm with said drilling means and said second fork arm with said ventilating means to different diameters of a container to be emptied by axially adjusting said telescopic pipe.

4. The device in accordance with claim 1, wherein said piercing spike is tubular and has a coaxially extending vent hole, said ventilating means including a tapping valve, said vent hole being connected to said tapping valve, whereby the actuation of said tapping valve allows ambient air to be fed to said piercing spike pierced through the wall of the container to be emptied or to said vent hole to ventilate said container.

5. The device in accordance with claim 4, wherein:

said piercing spike is pressed into a pipe branch, which opens into a ventilating space of said second fork arm, said ventilating space being provided in connection with a ventilating valve to ventilate said container; and said pipe branch is provided with a flexible tube seal surrounding said piercing spike at a spaced location, said flexible tube seal for sealing arranging said spike seal on the container.

6. The device in accordance with claim 1 wherein said piercing spike has a radial hole in a tubular wall, said radial hole extending for communicating with said container with said piercing spike having pierced through the wall of said container, said radial hole being connected to said vent hole of said piercing spike to ventilate the container.

7. The device in accordance with claim 1, wherein on a container side, said drain channel means has a pipe branch, on which a flexible tube seal is arranged, by means of which said drain channel means can be sealingly arranged on said container.

8. The device in accordance with claim 1, wherein said drain channel means includes a drain socket for a flexible tube, via which said drain channel means can be connected to a liquid-collecting container.

9. The device in accordance with claim 1, wherein said drill spindle has a guide collar with an O-ring seal, said guide collar being sealingly guided in said drain channel rotatably and axially displaceably.

10. The device in accordance with claim 1, wherein said ventilating means is connected to a flexible tube of said drain channel means or to a liquid-collecting container via a flexible pipeline, and a vent valve of said ventilating means is arranged integrated in said flexible pipeline.

* * * * *